Patented July 24, 1951

2,561,976

UNITED STATES PATENT OFFICE 2,561,976

DECALCOMANIA PAPER

Lewis Davis, Worcester, Mass., assignor to McLaurin-Jones Co., Brookfield, Mass., a corporation of Massachusetts No Drawing. Application October 9, 1947, Serial No. 778,765

3 Claims. (Cl. 117—3.6)

This invention relates to decalcomanias and to decalcomania papers, the latter term designating those papers prepared especially for the printing thereon of decalcomania designs in such a manner that they may be readily released for application to the surfaces of articles to which they are to be applied.

As is well understood by those skilled in this art, a decalcomania paper comprises a backing sheet which is readily absorbent to, or permeable by water, this sheet carrying on its surface one or more coatings of a specially prepared adhesive. These coatings are dry and non-tacky under normal conditions, adapted to take decalcomania printing, but including constituents which swell and dissolve rapidly in water to release the decalcomania print when desired.

Decalcomania prints are applied to a multitude of articles having surface characteristics which differ widely, and this fact introduces exceedingly troublesome problems in the matter of producing a firm adhesive union between the print and the article. Some surfaces, such as those made of plastics, vulcanized rubber, certain metals, wood surfaces finished in various ways and certain paints, are typical examples of articles having surface characteristics such that it is very difficult to produce adhesive compositions which will effect a secure union of a decalcomonia print to them.

To devise a thoroughly satisfactory solution for this problem forms the chief object of the present invention.

I have found that this object can be accomplished by making use of the excellent adhesive properties of highly concentrated rubber latices when properly associated with other water-soluble adhesives, especially if the latter are adapted to perform the three-fold function of assisting in the release of the decalcomania print, aiding substantially in securing said print to the article of work to which it is applied, and preserving the latex globules in a water-sensitive form after the coating on the backing sheet has been dried.

The latex may be either natural or synthetic. In making up the adhesive coating composition the commercial forms of latex, preferably containing approximately 50% solids, are used. Of the various synthetic forms, Neoprene latex such, for example, as the No. 571 put out by the Du Pont Company, or the regular G. R. S. latex, sold by several concerns, give good results. Suitable adhesives for use with the latex are a vegetable adhesive which is quickly soluble in water, dextrin being preferred, mixed with a stronger adhesive of animal origin, such as fish glue, hide, or bone glue.

A formula which has proved very satisfactory is as follows, the constituents being given on a percentage basis (parts in a hundred, by weight):

| | |
|---|---:|
| 1. Glue (animal or fish) | 2.7 |
| 2. Dextrin | 24.6 |
| 3. Water | 52.6 |
| 4. Alkali (sodium sesquisilicate) | 0.6 |
| 5. Latex (natural or synthetic) (50% total solids) | 19.5 |
| | 100.0 |

In the foregoing formula the alkali serves to protect the latex from the action of acids which may be formed in the composition, but the sodium sesquisilicate may be replaced by sodium metasilicate or other fixed alkalis. Good grades of the two specific compounds just mentioned are sold commercially by the Philadelphia Quartz Company under the names of Metso 99 and Metso granular. The proportion of alkali used should be such as to give the mixture a pH value of at least 9.5.

In making up this formula the glue and dextrin, with fifty (50) parts of water, are heated at temperatures of 140° to 150° F. until they are thoroughly dissolved. Then the alkali is dissolved in 2.6 parts of water and is added to the glue-dextrin solution, stirring continuously for about five minutes. This solution then is cooled down to 100° F., and the latex is added, while stirring rapidly for about another five minutes. Preferably the composition so formed is allowed to stand over night before being used.

Later it is applied, as for example, in a coating machine of one of the common commercial types to a web of water-leaf backing paper, this web previously having been coated with the usual starch sizing, as is customary in the present methods of manufacturing decalcomania papers, and the adhesive being applied over the starch coating. From the coating machine the web customarily is run through a drying chamber where it is festooned and dried in a current of hot air under time and temperature conditions such that the latex constituent of the coating will not be broken down.

After the coating and drying operations have been completed, the web customarily is cut up into sheets of the size required for use by the decalcomania printers. Such printing may be done directly on the outer adhesive coating made as above described, or a lacquer coat can be applied over the adhesive composition and the decalcomania printing can then be done on this lacquer coat in a manner well understood in this art.

It will be observed that the dried coating is composed of the same constituents referred to in the foregoing formula and in the same proportions, except for the water. Because most of the water has been driven off in the drying step, the latex solids left in the coating are only approximately half the weight given in the formula.

An important feature of this invention, however, is that the glue and the dextrin form protective colloids in which the globules of highly concentrated latex are distributed, even in the dried coating, the latex still holding sufficient water to maintain it in its dispersed form. This is important because if the latex were converted into solid rubber during the drying operation, then the coating would be made up essentially of the two water-soluble adhesives and a water-insoluble constituent having no adhesive properties. However, with the latex dried out to a highly concentrated state having a minimum water content but still in the form of an emulsion, all three of the ingredients of the adhesive coating are water-sensitive and they are softened and rendered tacky substantially simultaneously when the coating is thoroughly wet with water.

In applying the decalcomania print to an article of work the usual process may be followed. Ordinarily this consists simply in dipping the decalcomania sheet, with the design printed thereon, in water, removing it immediately, and then after allowing sufficient time (usually about twenty seconds) for the print to become loosened by the swelling of the starch coat and the softening and solution of the adhesives, it is slid off. It retains a sufficient proportion of the adhesive coating to secure it firmly to the surface to which it is to be applied, and such application consists simply in pressing it against that surface. As above indicated, the adhesive so adhering to the back of the decalcomania print comprises dextrin, glue, and rubber latex, all intimately intermingled, and these cooperate to produce a secure adhesion of the print to the surface to which they are applied. Some of the water-soluble constituents of this coating on the back of the print are lost in making the transfer so that some of the protection against the break-down of the latex which, up to this time has been afforded by the presence of these water-soluble adhesives, has been lost. Partly due to this fact and partly, also, I believe, to the slow evaporation of water which occurs after the print is applied, there takes place a very slow conversion of the latex from its emulsion form into a solid rubber form, where it produces a permanent waterproof union of the decalcomania print to the surface to which it has been applied. It is believed to be new to secure this result in the manner described.

While the formula above given has been found entirely satisfactory, some latitude in the proportions of the constituents is permissible. The percentages of the ingredients may be varied, as follows:

| | Parts |
|---|---|
| 1. Glue (animal or fish) | 1–13 |
| 2. Dextrin | 17.0–32.5 |
| 3. Water | 40–70 |
| 4. Alkali | 0.1–1.2 |
| 5. Latex (natural or synthetic) (50% total solids) | 5.0–50.0 |

As above indicated, the glue-dextrin ratio can be raised to as much as 2 to 3 and, if desired, the latex in the dried coat may constitute more than half of the total solid constituents of said coat. I have found that a stronger adhesion to many surfaces also is obtained by adding to either of the above formulae a water-soluble cellulose derivative of the nature of methylcellulose or sodium carboxymethylcellulose. Either of these compounds in proportions of one-quarter of one percent. to one percent. (dry weight) improve the strength of the adhesion to surfaces which are troublesome from this standpoint. These, and other modifications, may be made within the spirit and scope of this invention. Any of the common commercial forms of rubber latex, either natural or synthetic, can be used in practicing this invention as above described.

This invention has been found to meet all of the practical requirements of decalcomania printers, including those of providing a suitable surface to take the decalcomania printing, and freedom from handling difficulties during the printing operations. The adhesive coating, when once dried, remains dry and non-tacky indefinitely under normal atmospheric conditions, does not become sticky during shipment or storing and, in commercial language, it does not "block." Consequently, it does not require interleaving. Moreover, the final union of the decalcomania print to the work is exceptionally satisfactory for the reasons above pointed out.

Having thus described my invention, what I desire to claim as new is:

1. A decalcomania paper comprising a backing sheet highly pervious to water and an adhesive coating, normally dry and non-tacky, united firmly to one side of said sheet but readily releasable therefrom by water, said coating being adapted to take decalcomania printing and being composed mainly of an adhesive material including water soluble animal glue in an amount of the order of 1 to 13 parts by dry weight of said coating together with water soluble dextrin in an amount in excess of that of said glue and having therein dispersed rubber latex-water particles with a sufficient amount of fixed alkali to maintain said particles in water-sensitive form whereby the latter become tacky substantially simultaneously with the water-soluble adhesive when the sheet is thoroughly wet with water.

2. A decalcomania paper comprising a backing sheet highly pervious to water and an adhesive coating, normally dry and non-tacky, united firmly to one side of said sheet but readily releasable therefrom by water, said coating being adapted to take decalcomania printing and being composed mainly of an adhesive material including water soluble animal glue in an amount of the order of 1 to 13 parts by dry weight of said coating together with water soluble dextrin in an amount in excess of that of said glue and having therein dispersed rubber latex-water particles with a sufficient amount of fixed alkali to maintain said particles in water-sensitive form whereby the latter become tacky substantially simultaneously with the water-soluble adhesive when the sheet is thoroughly wet with water, said alkali being selected from the group consisting of sodium sesquisilicate and sodium metasilicate.

3. A decalcomania paper comprising a backing sheet highly pervious to water and an adhesive coating, normally dry and non-tacky, united firmly to one side of said sheet but readily releasable therefrom by water, said coating being composed essentially of the following:

|  | Parts by dry weight |
|---|---|
| Animal glue | 1–13 |
| Dextrin | 17–32.5 |
| Rubber latex-water particles in water-sensitive form | 2.5–25 |
| Fixed alkali | 0.1–1.2 |

LEWIS DAVIS.

REFERENCES CITED

The following references are of record in the file of this patent:

UNITED STATES PATENTS

| Number | Name | Date |
|---|---|---|
| 1,801,621 | Biddle | Apr. 21, 1931 |
| 2,273,694 | Davis et al. | Feb. 17, 1942 |
| 2,365,020 | Stillwell | Dec. 12, 1944 |
| 2,427,618 | Nagle et al. | Sept. 16, 1947 |

FOREIGN PATENTS

| Number | Country | Date |
|---|---|---|
| 166,731 | Great Britain | July 27, 1921 |
| 543,077 | Great Britain | Feb. 9, 1942 |